United States Patent
Smith (10) Patent No.: US 7,953,451 B2
(45) Date of Patent: May 31, 2011

(54) METHOD OF AN APPARATUS FOR HANDLING MESSAGES IN A MOBILE COMMUNICATIONS ENVIRONMENT

(75) Inventor: Alan Andrew Smith, Farnborough (GB); Julie Stuart, legal representative, Longfield (GB)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/499,759

(22) PCT Filed: Dec. 19, 2002

(86) PCT No.: PCT/GB02/05808
§ 371 (c)(1), (2), (4) Date: Oct. 7, 2005

(87) PCT Pub. No.: WO03/053080
PCT Pub. Date: Jun. 26, 2003

(65) Prior Publication Data
US 2006/0089128 A1    Apr. 27, 2006

(30) Foreign Application Priority Data
Dec. 19, 2001  (GB) .................................. 0130329.6

(51) Int. Cl.
*H04B 1/38*    (2006.01)
(52) U.S. Cl. ...................... 455/566; 455/466; 455/550.1
(58) Field of Classification Search ....... 455/412.1–413, 455/422.1, 418–420, 466, 428, 445, 425, 455/556.1, 566, 562.1; 709/203–207; 345/156, 345/2.3, 3.1
See application file for complete search history.

(56) References Cited

U.S. PATENT DOCUMENTS

| 4,258,751 | A |   | 3/1981  | Humpert              |
|-----------|---|---|---------|----------------------|
| 5,258,751 | A |   | 11/1993 | DeLuca               |
| 5,678,179 | A |   | 10/1997 | Turcotte et al.      |
| 6,018,657 | A | * | 1/2000  | Kennedy et al. ........... 455/426.1 |
| 6,119,014 | A | * | 9/2000  | Alperovich et al. .......... 455/466 |
| 6,198,931 | B1| * | 3/2001  | Smith et al. ................... 455/445 |
| 6,545,996 | B1| * | 4/2003  | Falco et al. .................... 370/347 |
| 6,751,463 | B1| * | 6/2004  | Lorello et al. ................ 455/466 |
| 7,039,428 | B1| * | 5/2006  | Helferich ....................... 455/458 |
| 2002/0039904 | A1| * | 4/2002 | Anderson ....................... 455/456 |

FOREIGN PATENT DOCUMENTS

| DE | 10002030   | 7/2001 |
|----|------------|--------|
| EP | 1197929    | 4/2002 |
| EP | 1182892 B1 | 2/2004 |
| WO | 9309520 A1 | 5/1993 |

(Continued)

OTHER PUBLICATIONS

International Search Report, PCT/GB02/005808, International Search Authority-European Patent Office. Apr. 17, 2003.

(Continued)

*Primary Examiner* — Kamran Afshar
(74) *Attorney, Agent, or Firm* — Sandip S. Minhas; Abdollah Katbab (57) ABSTRACT

A method and system of transferring messages from a message source to a mobile station in a cellular system comprises assigning to each message a priority characteristic before the message is transmitted to mobile station. The message is then transmitted together with the assigned priority characteristic, depending on the priority characteristic. The priority characteristic is examined at the mobile station and the message is processed at the mobile station depending on the priority characteristic.

57 Claims, 4 Drawing Sheets

FOREIGN PATENT DOCUMENTS

| WO | 9708906 | 3/1997 |
| --- | --- | --- |
| WO | 9732439 | 9/1997 |
| WO | 9834422 | 8/1998 |
| WO | 9913597 A1 | 3/1999 |
| WO | 0035213 | 6/2000 |
| WO | 0154436 A1 | 7/2001 |

OTHER PUBLICATIONS

GSM 03.40 Version 5.6.0 (ETS 300 901) Digittal Cellular Telecommunications System (Phase 2+); Technical Realization of the Short Message Service (SMS); Point-To-Point (PP): Aug. 1997.

International Preliminary Examination Report-PCT/GB02/005808, International Search Authority—European Patent Office—Oct. 24, 2003.

3GPP Technical Specification TS 23.040 V.5.1.0 3rd Generation Partnership Project; Technical Specification Group Terminals; Technical Realization of the Short Message Service (SMS); (Release 5) (Sep. 21, 2001).

3GPP TS 23.140 V5.0.0 '3rd Generation Partnership Project; Technical Specification Group Terminals; Multimedia Messaging Service (MMS); Functional Description; Stage 2 (Release 4) (Sep. 21, 2001).

Written Opinion—PCT/GB02/005808, International Search Authority—European Patent Office—Aug. 1, 2003.

* cited by examiner

METHOD OF AN APPARATUS FOR HANDLING MESSAGES IN A MOBILE COMMUNICATIONS ENVIRONMENT

BACKGROUND OF THE INVENTION

I. Field of the Invention

The present invention relates generally to a method of and apparatus for handling messages in a mobile communications environment.

II. Description of the Related Art

A feature of mobile telecommunication services is the so-called short message service (SMS), a service in which text based messages may be sent between stations (typically two mobile stations). This service is particularly used in digital networks e.g. CDMA and GSM networks. SMSs have proved popular with customers and also with service providers who see them as a way to increase revenue.

The SMS message service has proved extremely popular and fashionable, and is seen by service companies as one means of increasing revenue as the next generation (so-called 3G) of cellular services becomes available. There is however a problem with the above-described present SMS arrangement. Currently, the handset only knows of one type of message (defined by the Short Message Service specification), and so every message has equal priority. This in turn means that there is no way to distinguish whether a particular message is more important than another or whether it should be just displayed or stored for later viewing.

A mobile station only has a finite amount of memory available to it for storing SMS messages and the like. Once that memory is full it is not possible for the mobile station to receive further SMS messages until space has been cleared in the memory. Thus, the above-described delivery of a priority message will be attempted if the mobile station has not been identified as unreachable irrespective of whether the mobile station has been identified as having no free memory capacity.

SUMMARY OF THE INVENTION

As the 3G services begin to take shape, the networks (typically cellular telephone service providers) are looking at ways to increase revenue by targeting messages at handsets based on handset location. With the networks being upgraded to the 3G (or later) specifications, networks will hold information about the position of each handset, using either triangulation in the network or a GPS receiver in the handset. This will enable the network to target position sensitive services to each individual handset. Understandably, this is generating a great deal of interest from advertisers. For example, a user might receive a message informing him of a sale at a department store that he is approaching, or a lunchtime special menu at a nearby restaurant. The possibilities are huge.

One drawback in all of this is that mobile handsets only have a fixed amount of memory in which to store the messages it receives. A system for sorting or prioritising those messages is therefore required. To do this, it becomes necessary to categorize the messages as they arrive into priority groups that dictate how the message should be handled. The primary categorizing factor could be the identity of the sender. If the sender were known to the user (via the handset phone book, for example) then the default action would be to save the message for later retrieval and inform the user of the message arrival). The user can then retrieve the message at his leisure. If the message has an optional survival condition attached, then that message should be saved until the survival condition is no longer true, at which point it should be automatically deleted.

If the sender is not known to the user, then the handset can similarly prioritise the messages.

The invention aims to address the problem of handling the potentially large amount of messages a mobile handset could receive by providing a method and apparatus for handling the potentially large number of SMS messages that could be received by a mobile station and prioritising them.

According to one aspect of the invention there is provided a method of transferring messages from a message source to a mobile station in a cellular system, the method comprising: assigning to each message at the message source a priority characteristic; transmitting the message to mobile station together with the assigned priority characteristic, the transmission of the message being dependent on the priority characteristic; examining the priority characteristic at the mobile station; and processing the message at the mobile station depending on the priority characteristic.

According to another aspect of the invention there is provided a system of transferring messages from a message source to a mobile station in a cellular system, the system comprising: means for assigning to each message a priority characteristic; means for transmitting the message to mobile station together with the assigned priority characteristic, the transmission of the message being dependent on the priority characteristic; means for examining the priority characteristic at the mobile station; and means for processing the message at the mobile station depending on the priority characteristic.

The invention also provides a mobile station for receiving messages, the station comprising: a receiver for receiving a signal containing a message from a message source, the message having an assigned priority characteristic; a store for storing message data; and a controller for examining the priority characteristic of the message and storing the message data in the store depending on the priority characteristic.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN EMBODIMENT OF THE INVENTION

Figure 1:
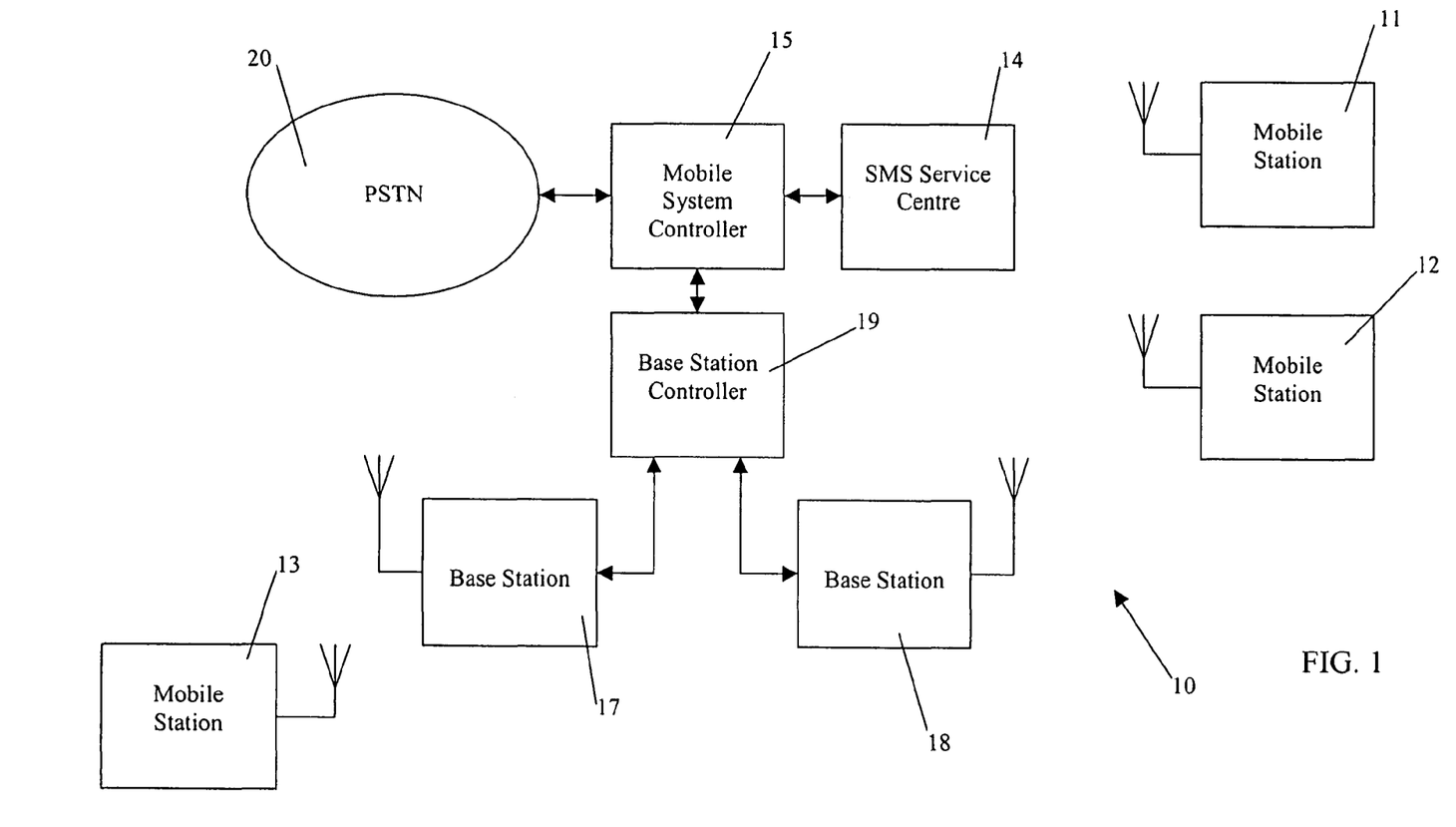
FIG. 1 is a schematic system diagram of a cellular communications system incorporating a short message service (SMS) facility.

FIG. 1 of the accompanying drawings shows a cellular communications system 10 incorporating a short message service (SMS) facility. The short message service (SMS) provides a means of sending messages of limited size to and from mobile handsets, or stations (MS) 11, 12, 13. The provision of short message service makes use of a service centre 14, which acts as a store and forward centre for messages. Two different point-to-point services have been defined. The first of these is mobile originated (MO) messages, which will be transported from a mobile station 11, 12, 13 to an SMS service centre 14 associated with a mobile system controller (MSC) 15. The MO message is transported via a base station 17, 18, through a base station controller (BSC) 19 to its destination either at another mobile station 11, 12, 13 or at a subscriber on a fixed network, such as the public switched telephone network (PSTN) 20 connected to the mobile system controller 15. The second is mobile terminated (MT) messages, which will be transported from the service centre 14 to one or more of the mobile stations 11, 12, 13. Mobile terminated (MT) messages may be input to the same service centre 14 by other mobile users (via messages) or by a variety of other services e.g. speech, telex, fax, email, multimedia, Internet, etc. (not shown).

Figure 4:
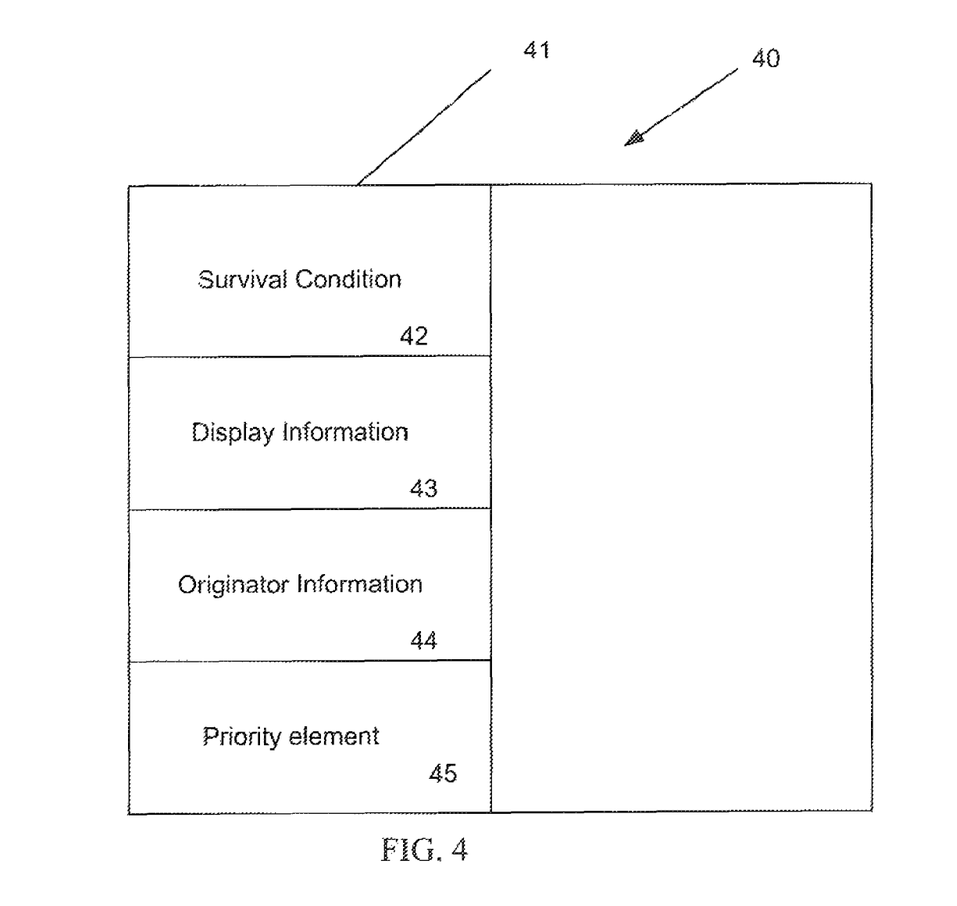
FIG. 4 is a schematic diagram of an aspect of an SMS message of the communications system of FIG. 1.

When an SMS message 40, in FIG. 4, is sent, the system attaches several information elements 41 to it. These elements are intended to provide the service centre 14 with delivery prioritisation data and comprise data defining or identifying the following, namely: a validity period; service-time-time stamp; protocol ID; more messages to send; priority; messages waiting; and alert service centre. These elements are used by the service centre 14 to determine how and when to attempt delivery of an SMS message to a mobile station 11, 12, 13.

The validity period indicates how long the service centre shall guarantee the short message service existence in service centre memory before delivery to the recipient has been carried out. The service centre time stamp element holds the information relating to when the service centre received the short message service. The service-centre-time stamp is used together with the validity period to decide when a short message service can be removed from the service centre.

The priority element 45 is a simple flag, which the service centre interprets depending on the mobile station: delivery of a non-priority message will not be attempted if the mobile station has been identified as temporarily absent; and delivery of a priority message will be attempted if the mobile station 11, 12, 13 has not been identified as unreachable.

Within the SMS message delivered to the mobile station 11, 12, 13 there are several header information elements, which carry various information, such as sender ID 44, etc. The format of the address field is shown in Table 1. TABLE-US-00001 TABLE 1 SMS Header Information Element Octet # Usage 1 Address field length 2 Type-of-Address 3 Address Value 1 4 Address Value 2 5 Address Value 3 . . . n Address Value n–2

TABLE 1

| SMS Header Information Element | |
|---|---|
| Octet # | Usage |
| 1 | Address field length |
| 2 | Type-of-Address |
| 3 | Address Value 1 |
| 4 | Address Value 2 |
| 5 | Address Value 3 |
| ... | ... |
| n | Address Value n − 2 |

The type-of-address field carries the sender identity in a number of formats. The type-of-address field comprises two elements, namely type-of-number and numbering-plan-identification.

The Type-of-Number element comprises 3 bits, coded as set out in Table 2.

TABLE 2

| Type-of-Number Element | |
|---|---|
| 000 | Unknown |
| 001 | International Number |
| 010 | National Number |
| 011 | Network Specific Number |
| 100 | Subscriber Number |
| 101 | Alphanumeric |
| 110 | Abbreviated Number |
| 111 | Unknown |

The Numbering-plan-identification element comprises 4 bits, coded as set out in Table 3.

TABLE 3

| Numbering-Plan-Identification Element | |
|---|---|
| 0000 | Unknown |
| 0001 | ISDN/telephone numbering plan. (E.164/E.163) |
| 0011 | Data numbering plan (X.121) |
| 0100 | Telex numbering plan |
| 1000 | National numbering plan |
| 1001 | Private numbering plan |
| 1010 | ERMES numbering plan (ETSI DE/PS 3 01-3) |
| 1111 | Reserved for extension |
| xxxx | All other values reserved |

For type-of-number=101, the numbering-plan-identification bits are reserved and are 0000. Note that for addressing any of the entities service centre, MSC or mobile station numbering-plan-identification=0001 will always be used.

As the 3G services begin to take shape, the networks are looking at ways to increase revenue by targeting messages at handsets based on handset location. With the networks being upgraded to the 3G (or later) specifications, networks will hold information about the position of each handset, using either triangulation in the network or a GPS receiver in the handset. This will enable the network to target position sensitive services to each individual handset. Understandably, this is generating a great deal of interest from advertisers. For example, a user might receive a message informing him of a sale at a department store that he is approaching, or a lunchtime special menu at a nearby restaurant. The possibilities are huge.

One drawback in all of this is that mobile handsets only have a fixed amount of memory in which to store the messages it receives. A system for sorting or prioritising those messages is therefore required. To do this, it becomes necessary to categorize the messages as they arrive into priority groups that dictate how the message should be handled. The primary categorizing factor could be the identity of the sender. If the user knows the sender (via the handset phone book or number directory, for example) then the default action would be to save the message for later retrieval and inform the user of the message arrival). The user can then retrieve the message at his leisure. If the message has an optional survival condition 42 attached, then that message should be saved until the survival condition is no longer true, at which point it should be automatically deleted.

Figure 2:
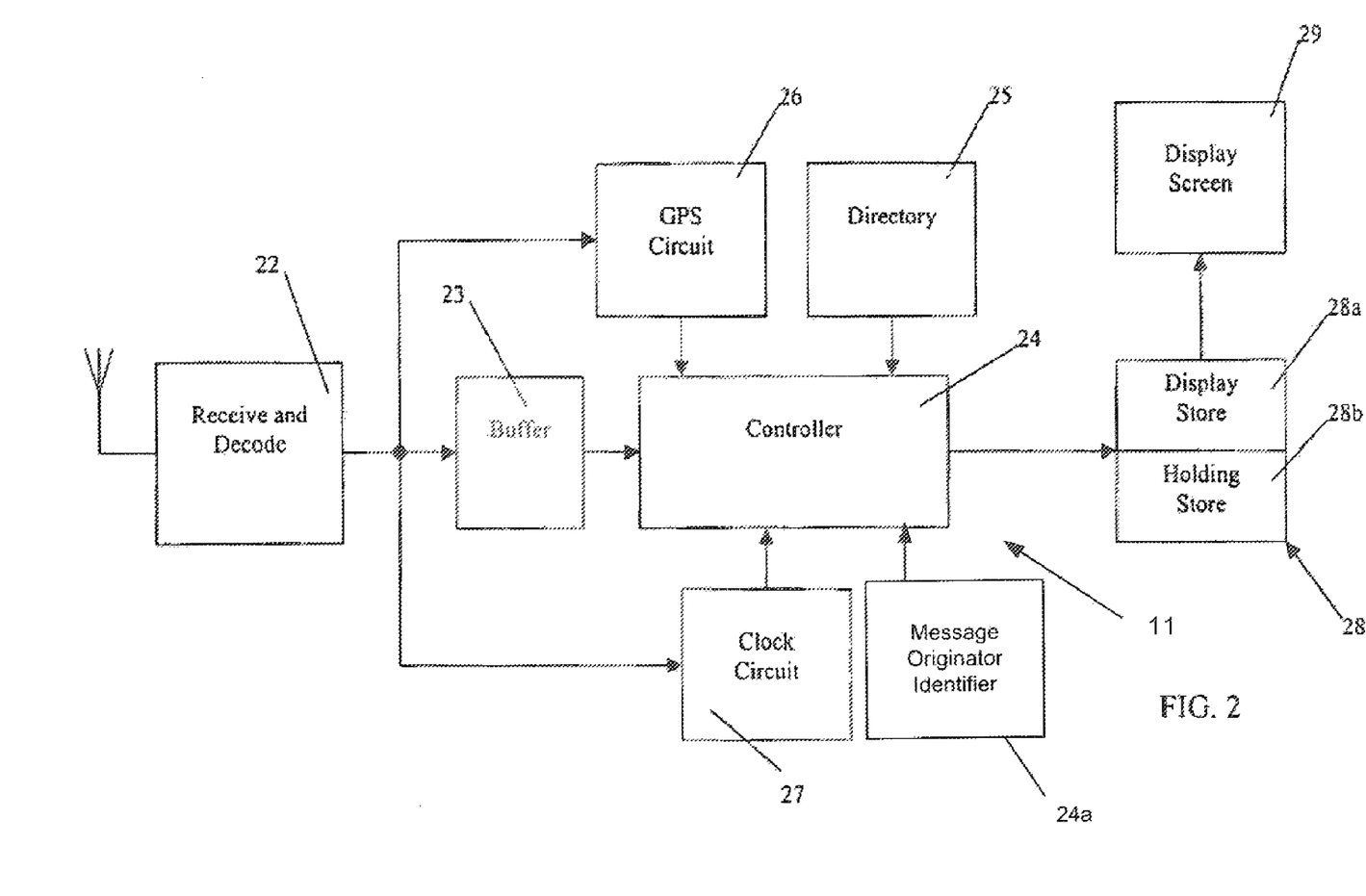
FIG. 2 is a schematic system diagram of a receiver in a mobile station of a cellular communications system of FIG. 1.

FIG. 2 of the accompanying drawings shows in schematic form a receiver of a mobile station 11 that is able to manage prioritised SMS messages. The mobile station 11 comprises a receiver and decoder circuit 22, which receives and decodes communication signals from the base station 17, 18 (see FIG.

1). The functions performed by the receiver and decoder circuit 22 are in themselves well known and are not directly relevant to the invention. The functions and operations of the receiver and decoder circuit 22 will therefore not be described in any further detail herein.

SMS message data received and decoded by the receiver and decoder circuit 22 is input to a buffer 23 where the priority data is examined by a controller 24. The controller 24 is coupled to a GPS circuit 26, which provides, to the controller 24, position data identifying the location of the mobile station 11. The functions performed by the GPS circuit 26 are in themselves well known and specified in various publicly available documents pertaining to the various 3G standards and therefore need not be described in any further detail herein.

The controller 24 is also coupled to receive telephone number data from a directory 25 in which is stored data identifying "known" numbers. Typically this will be data entered into the mobile station by the user. The directory serves as a look up table for the controller to enable the controller, such as through a message originator identifier 24a, to identify messages from "known" sources. A local clock circuit 27 provides to the controller data identifying the current time. The time data may be generated internally by the clock circuit 27 or may be derived from time information contained in signals received by the receiver and decoder circuit 22, as is well known.

A store 28 is also provided for storing SMS messages selected by the controller 24 for display on a display panel 29. The store is divided into two parts, a display store portion 28a for storing data defining one or more messages for current display and a holding store portion 28b for storing data defining messages available for selection by a user for display subsequently, as provided by display information 43. Examples of such display information are described further in Table 4. In practice the two parts of the store may be provided as separate units or as a single unit divided into two parts. The form of the store 28 is a matter of implementation choice.

The controller 24 examines the priority information from the buffer 23, the numbers from the directory 25, the position data from the GPS circuit 26 and the time data from the clock circuit 27 to determine what to do with the message content of the received SMS message. There are, of course, several ways in which messages may be prioritised. One starting point would be to look at the data in the SMS message to see if it originates from a known source. If it does come from a familiar origin, then the message could be passed on to the store for immediate display or subsequent retrieval as desired by the user of the mobile station.

Figure 3:
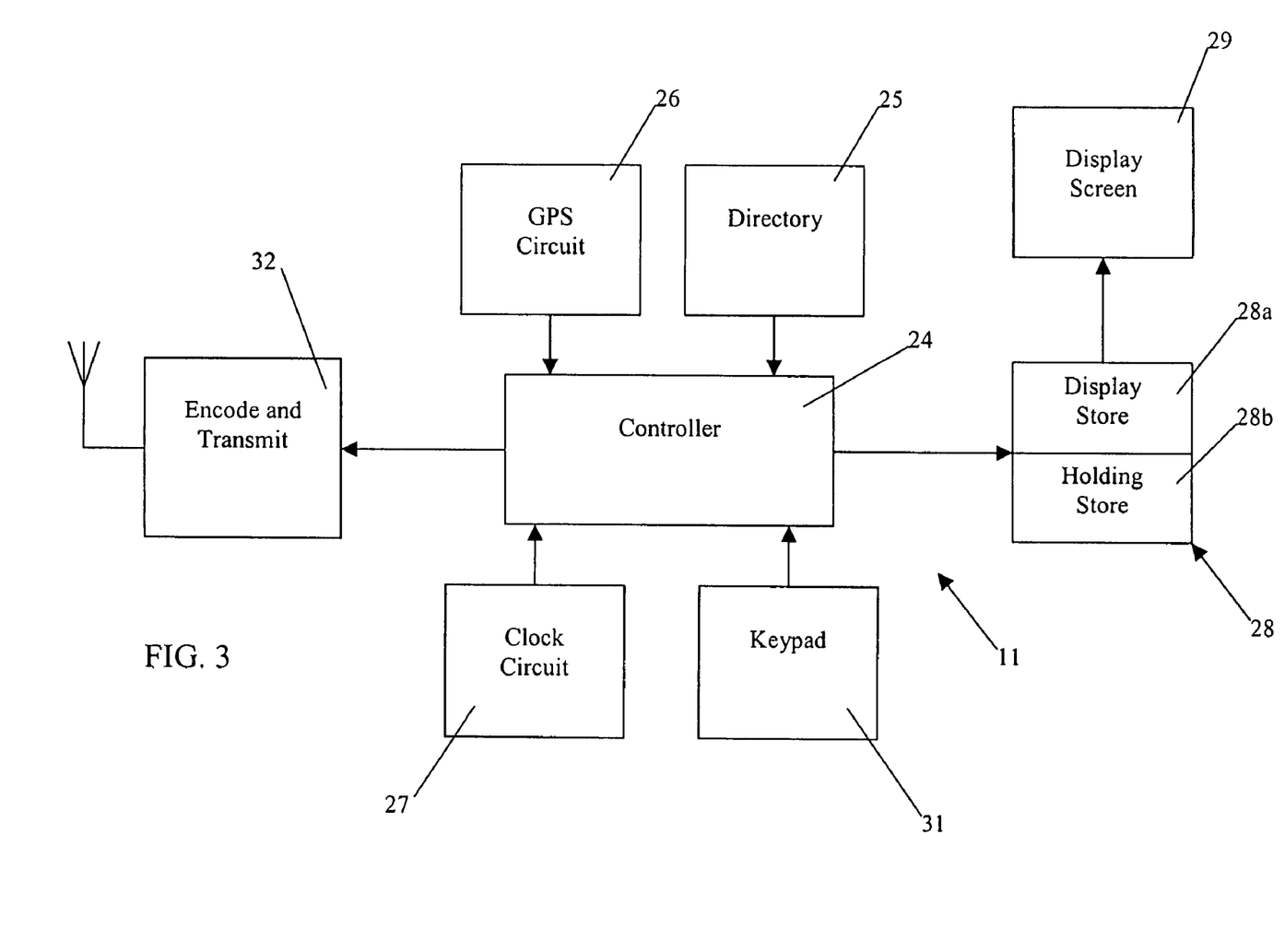
FIG. 3 is a schematic system diagram of a transmitter in a mobile station of a cellular communications system of FIG. 1.

FIG. 3 of the accompanying drawings shows in schematic form the transmitter side of the mobile station 11. Many of the units in the transmitter side are the same as those in the above-described receiver side. Only the differences will be described in the following. The mobile station comprises a keypad 31 (typically the ubiquitous numeric keypad on all mobile phones) coupled to the controller 24. User manipulation of key (not shown) on the keypad causes data representing characters to be generated and input to the controller 24. The thus generated data is held in the holding portion 28b of the store 28 until a complete message has been generated.

Once the message is ready for transmission (as determined by the user inputting a 'send' command via the keypad) the message data is read from the store 28 by the controller 24, which adds to the message data identifying the mobile station and, if desired, data identifying the time of the message and the position at the time of transmission of the mobile station. The time and position data is obtained by the controller 24 from the GPS circuit 26 and the clock circuit 27. The data thus compiled by the controller 24 is then output to an encode and transmit circuit 32 which encodes and transmits communication signals to a base station for further processing and onward transmission by the SMS service centre 14.

When a mobile station receives an SMS message the priority data associated with it is processed to determine what to do with the data. In the following example it will be assumed that the highest priority is assigned to messages from sources (e.g. mobile stations of other users) known o the user of the receiving mobile station. If the user knows the source, the incoming SMS message is saved for immediate or subsequent display.

If the user does not know the sender of the SMS message, then the mobile station 11 could prioritise the messages in accordance with a predetermined scheme, such as that set forth in the following Table 4.

TABLE 4

Message Priorities

| Message Priority (type) | Sender Known | Time-based survival | Position-based survival | Display only | Action to be taken to handle message |
|---|---|---|---|---|---|
| 1 | Yes | No | No | No | Store message for later retrieval. |
| 2 | Yes | Yes | No | No | Store message for later retrieval. Auto delete when survival time has elapsed. |
| 3 | Yes | No | Yes | No | Store message for later retrieval. Auto delete when survival position no longer matches handset location. |
| 4 | Yes | Yes | Yes | No | Store message for later retrieval. Auto delete when both survival conditions are no longer applicable. |
| 5 | Yes | No | No | Yes | Do not store the message, just display it immediately. |
| 6 | Yes | Yes | No | Yes | Do not store the message, just display it until the survival time has elapsed. |
| 7 | Yes | No | Yes | Yes | Do not store the message, just display it until the survival position no longer matches handset location. |
| 8 | Yes | Yes | Yes | Yes | Do not store the message, just display it until both survival conditions are no longer applicable. |
| 9 | No | No | No | No | Store message for later retrieval. |
| 10 | No | Yes | No | No | Store message for later retrieval. Auto delete when survival time has elapsed. |
| 11 | No | No | Yes | No | Store message for later retrieval. Auto delete when survival position no longer matches handset location. |
| 12 | No | Yes | Yes | No | Store message for later retrieval. Auto delete when both survival conditions are no longer applicable. |
| 13 | No | No | No | Yes | Do not store the message, just display it immediately. |
| 14 | No | Yes | No | Yes | Do not store the message, just display it until the survival time has elapsed. |
| 15 | No | No | Yes | Yes | Do not store the message, just display it until the survival position no longer matches handset location. |

TABLE 4-continued

Message Priorities

| Message Priority (type) | Sender Known | Time-based survival | Position-based survival | Display only | Action to be taken to handle message |
|---|---|---|---|---|---|
| 16 | No | Yes | Yes | Yes | Do not store the message, just display it until both survival conditions are no longer applicable. |

In the scheme set out in Table 4, priority 1 is the most important and the highest priority message always gets preference for storage or display. Furthermore, higher-priority messages can auto-delete lower priority ones if the higher priority message needs the storage space to survive. As will be appreciated by those possessed of the appropriate skills from consideration of Table 4, the prioritising of messages only requires 3-bits to be added to the message (or message header) and can support the existing message handling using priorities 1 and 9.

The "sender known" field is evaluated when the SMS message is received by the mobile station 11 (as has already been explained), so the message only needs to carry the survival conditions pertaining to time and location. The responsibility for deciding which type to apply to a message would rest with the network. For example, a message from another handset would be sent with the survival and display conditions set to false, so that the handset would either recognize the sender or not, but would store the message in the store 29 for later retrieval and display.

In the case of an advertisement, the "display only" condition could be set together with a position and/or a survival time. This would ensure that the message would only be available for display as long as it is relevant to the user and would not be stored. Another example of this kind of message would be to give the user directions to their desired destination from their current location possibly auto-updating at regular intervals until they reach their destination. These are the kind of value-added services that the network operators envisage the next generation of communications systems will be able to offer.

The preferred implementation of the short message service prioritisation resides in the mobile station, but it requires support from the mobile network to deliver short message service messages with the appropriate information structure. The prioritisation scheme is also able to work with mobile stations that do not include a prioritisation facility as such. In this case, the above Table 4, which presents 16 possible options, would collapses to just two options, namely message types 1 and 9, where the sender is either known or not known to the mobile station. Even this simple enhancement would be beneficial and doesn't require any additional support from the network. Network support is required when the time-based survival, position-based survival and display-only data elements are added to the short message service structure.

One method, presently preferred, of encapsulating the additional data to be sent is to extend the address field to carry multiple data fields, as shown in Table 5.

TABLE 5

Extended Address Fields

| Octet # | Usage |
|---|---|
| 1 | Address field length |
| 2 | Type-of-Address |
| 3 | Address Value 1 |
| 4 | Address Value 2 |
| 5 | Address Value 3 |
| ... | ... |
| N | Address Value n−2 |
| N+1 | Extended Mode |
| N+2 | Survival Time |
| N+3 | Survival Position 1 |
| ... | ... |
| N+8 | Survival Position 6 |
| N+9 | Survival Region |

The format remains the same up to octet N+1 where an extended mode field is added to signal whether the message includes display-only, survival-time and survival-position information. An example of one format for the extended mode field is set out in Table 6.

TABLE 6

Extended Mode Filed

| Bit # | Interpretation |
|---|---|
| 7 | Display Only. If zero, message needs to be save in mobile station memory If one, message is for display only, no storage required. |
| 6 | Survival Position Data Present If zero, no survival position data is included. If one, survival position data is included. |
| 5 | Survival Time Data Present. If zero, no survival time data is included. If one, survival time data is present. See bits 4 & 3 for interpretation of survival time field |
| 4 | Interpreted together with bit #3 to give survival time units: 00 = survival time is in seconds. 01 = survival time is in minutes. 10 = survival time is in hours. 11 = survival time is in days. |
| 3 | See bit #4 above. |
| 2 | Interpreted together with bit #1 to give survival region units: 00 = survival region is in metres. 01 = survival region is in 10 metre units 10 = survival region is in 100 metre units. 11 = survival region is in Kilometres. |
| 1 | See bit #2 above |
| 0 | Reserved - code as zero |

The survival time field holds a positive integer whose units are given by bits 3&4 of the Extended mode field. One format of the survival position elements is set out in Table 7.

TABLE 7

Survival Position Elements

| Octet # | Interpretation |
|---|---|
| 1 | Latitude: Degrees. Positive integer range 0..359, uses bit 7 of Octet #2 for LSB hence giving 9 bits (0..511) for this field. |
| 2 | Latitude: Minutes. Bit 7: used as LSB for Octet #1. Bit 6: not used, code as zero. Bits 5 .. 0: used for minutes (0..59). |

TABLE 7-continued

Survival Position Elements

| Octet # | Interpretation |
|---|---|
| 3 | Latitude: Seconds.<br>Bits 7 .. 6: not used, code as zero.<br>Bits 5..0: used for seconds (0..59). |
| 4 | Longitude: Degrees<br>Positive integer range 0..359, uses bit 7 of Octet #5 for LSB hence giving 9 bits (0..511) for this field. |
| 5 | Longitude: Minutes.<br>Bit 7: used as LSB for Octet #4.<br>Bit 6: not used, code as zero.<br>Bits 5 .. 0: used for minutes (0..59). |
| 6 | Longitude: Seconds.<br>Bits 7 .. 6: not used, code as zero.<br>Bits 5..0: used for seconds (0..59). |
| 7 | Survival Region.<br>Positive integer: range 0..255<br>This gives the radius of the survival circle centred on the latitude & longitude coordinates specified in octets #1 through #6.<br>For units see bits 1 & 2 of extended mode field. |

It will be appreciated that the above-described prioritising scheme will reduce the likelihood of the memory in the mobile station filling completely with messages. There will, however, be some circumstances where the messages in the memory will reach the capacity of the memory. One such situation would be where the user simply does not bother to delete old messages from the mobile station. Another case would be where a large number of messages coincidentally arrive at the mobile station in a short period of time. When the memory reaches capacity, the controller 24 may use the prioritising data to delete selected messages from the memory so as to free space in the memory for incoming messages of higher priority. The controller may also be arranged to apply user-defined filters (in much the same way as is done in some e-mail applications) to discard messages of no interest to the user.

Those possessed of the appropriate skills will appreciate that the above-described scheme is one of many different schemes that could be applied to the SMS messaging in a cellular (or other) communications system. The invention is not limited to the above-described prioritising scheme.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

The invention claimed is:

1. A method of transferring messages from a message source to a mobile station in a cellular system, the method comprising:
   assigning to each message a priority characteristic including information identifying the message source and display information defining the message as either one for immediate display or one for subsequent display; and
   transmitting the message to the mobile station together with the assigned priority characteristic, wherein the information identifying the message source and display information is operable to cause the mobile station to determine a new priority for storing the message on the mobile station, wherein the message source and display information is operable to cause the mobile station to store the message, if the display information defines the message as one to be stored for subsequent display, or to display and then delete the message, if the display information defines the messages as one for immediate display.

2. The method of claim 1, wherein the assigning of a priority characteristic comprises assigning time information defining the message as time dependent.

3. The method of claim 1 wherein the assigning of a priority characteristic comprises assigning position information defining the message as position dependent.

4. The method of claim 1, further comprising receiving the message at a message service centre from a message source, wherein the message is generated at the message source, and wherein transmitting comprising transmitting to the mobile station from the message service centre.

5. The method of claim 4, wherein the priority characteristic is assigned to each message at the message service centre.

6. The method of claim 1, wherein the priority characteristic is assigned to each message at the message source.

7. The method of claim 1, wherein the information identifying the message source is operable to cause the message to be stored at the mobile station if the message source is known.

8. The method of claim 7, wherein the assigning of a priority characteristic comprises assigning time information defining the message as time dependent and wherein the time information is operable to cause the message to be stored at the mobile station if the time information is current.

9. The method of claim 7, wherein the assigning of a priority characteristic comprises assigning position information defining the message as position dependent and wherein the position information is operable to cause the message to be stored at the mobile station if the position information is current.

10. The method of claim 1, wherein the priority characteristic is operable to cause. deletion of a previously stored message of lower priority at the mobile station depending on the new priority and a storage availability of the mobile station.

11. A system of transferring messages from a message source to a mobile station in a cellular system, the system comprising:
   means for assigning to each message a priority characteristic including information identifying the message source and display information defining the message as either one for immediate display or one for subsequent display; and
   means for transmitting the message to the mobile station together with the assigned priority characteristic, wherein the information identifying the message source and display information is operable to cause the mobile station to determine a new priority for storing the message on the mobile station, wherein the message source and display information is operable to cause the mobile station to store the message, if the display information defines the message as one to be stored for subsequent display, or to display and then delete the message, if the display information, defines the messages as one for immediate display.

12. The system of claim 11, wherein the means for assigning a priority characteristic comprises means for assigning time information defining the message as time dependent.

13. The system of claim 11 wherein the means for assigning a priority characteristic comprises means for assigning position information defining the message as position dependent.

14. The system of claim 11, further comprising means for receiving the message at a message service centre from a message source, wherein the message is generated at the message source, and wherein the means for transmitting further comprising means for transmitting to the mobile station from the message service centre.

15. The system of claim 14, wherein the priority characteristic is assigned to each message at the message service centre.

16. The system of claim 11, wherein the priority characteristic is assigned to each message at the message source.

17. The system of claim 11, wherein the information identifying the message source is operable to cause the message to be stored at the mobile station if the message source is known.

18. The system of claim 17, wherein the means for assigning a priority characteristic comprises means for assigning time information defining the message as time dependent and wherein the time information is operable to cause the message to be stored at the mobile station if the time information is current.

19. The system of claim 17, wherein the means for assigning a priority characteristic comprises means for assigning position information defining the message as position dependent and wherein the position information is operable to cause the message to be stored at the mobile station if the position information is current.

20. The system of claim 11, further comprising means for deleting a previously stored message of lower priority if the priority of the message comprises a higher priority.

21. The system of claim 11, wherein the priority characteristic is operable to cause the mobile station to delete a previously stored message of lower priority if the message comprises a higher priority.

22. A mobile station for receiving messages, the station comprising:
    a receiver for receiving a signal containing, a message from a message source, the message having an assigned priority characteristic including information identifying the message source and a message survival condition;
    a store for storing the message;
    a survival parameter; and
    a controller for examining the priority characteristic of the message received, assigning a new priority to the message depending on the message source, and storing the message in the store depending on the new priority of the message, wherein the controller stores the message if the survival parameter meets the survival condition and deletes the message if the survival parameter does not meet the survival condition.

23. The mobile station of claim 22, further comprising a display screen for displaying information in the message, and wherein:
    the priority characteristic comprises display information; and
    the controller is arranged to respond to the display information by outputting the message for display on the display screen or storing the message for subsequent display.

24. The mobile station of claim 22, wherein:
    the controller is arranged to respond to the priority characteristic by storing the message in the store if the message source is known.

25. The mobile station of claim 22 further comprising a clock circuit for identifying current time, and wherein:
    the priority characteristic comprises time information defining the message as time dependent; and
    the controller is coupled to the clock circuit and is arranged to respond to the priority characteristic by storing the message in the store if the time information is current.

26. The mobile station of claim 22, further comprising a position circuit for identifying current position, and wherein:
    the priority characteristic comprises position information defining the message as position dependent; and
    the controller is coupled to the position circuit and is arranged to respond to the priority characteristic by storing the message in the store if the position information is current.

27. The mobile station of claims 22, wherein the controller comprises a look up table defining message priorities and is arranged to delete a previously stored message of lower priority if the new priority of the message comprises a higher priority.

28. A method of handling messages at a mobile station in a cellular system, comprising:
    receiving a message at the mobile station, the message comprising at least one information element, wherein the at least one information element comprises a message originator identifier;
    checking a directory on the mobile station for a match to the message originator identifier, wherein the directory comprises at least one known message originator identifier;
    determining a priority of the message according to a predetermined priority scheme executed by the mobile station and based on the message originator identifier, wherein determining the priority of the message further comprises assigning a first priority if the checking results in finding the match and assigning a second priority if the checking results in not finding the match, wherein the first priority is higher than the second priority; and
    determining whether to store the message depending on the determined priority.

29. The method of claim 28, wherein determining the priority of the message based on the predetermined priority scheme further comprises identifying whether the at least one information element includes a message survival condition, further comprising checking mobile station-based data corresponding to the message survival condition, and assigning one of a plurality of priorities depending on a result of the identifying and the checking.

30. The method of claim 29, wherein determining whether to store the message further comprises determining an amount of available storage space, and storing the message if the assigned priority comprises a first priority higher than a second priority of a previously stored message.

31. The method of claim 28, wherein receiving the message comprising at least one information element further comprises receiving a message survival condition, further comprising:
    checking a survival parameter on the mobile station, and wherein determining whether to store the message further comprises storing the message if the survival parameter meets the survival condition, and automatically deleting the message when the survival parameter does not meet the survival condition.

32. The method of claim 31, wherein receiving the message survival condition further comprises receiving at least one of a time-based survival condition or a position-based survival condition.

33. The method of claim 28, wherein receiving the message comprising at least one information element further comprises receiving display information, and wherein determining whether to store the message further comprises storing the message if the display information defines the message as one to be stored for subsequent display, and displaying the message if the display information defines the message as one for immediate display.

34. The method of claim 33, wherein receiving the message comprising at least one information element further comprises receiving a message survival condition, further comprising:
checking a survival parameter on the mobile station, and
wherein storing or displaying the message further comprise storing or displaying if the survival parameter meets the survival condition, and automatically deleting the message when the survival parameter does not meet the survival condition.

35. The method of claim 28, wherein receiving the message comprising at least one information element further comprises receiving based on a delivery priority defined by the at least one information element, and wherein determining a priority further comprises determining a storage priority different from the delivery priority.

36. The method of claim 35, wherein receiving based on the delivery priority further comprises receiving the message from a message service centre in a predetermined order based on the at least one information element comprising delivery prioritization data including at least one of a validity period, a service centre time stamp, a protocol ID, an indication of more messages to send, a message originator-input priority, a messages waiting indicator, or an alert service centre indicator.

37. A mobile station for receiving messages, comprising:
a receiver operable to receive a signal containing a message from a message source, the message comprising a message originator identifier;
a store operable to store messages;
a directory having atleast one known message originator identifier; and
a controller operable to examine the message originator identifier of a received message, check the directory for a match to the message originator identifier, determine a priority of the message according to a predetermined priority scheme and based on the message originator identifier, and determine whether to store the message depending. on the determined priority, wherein the controller is operable to assign a first priority to the message if the checking results in finding the match and to assign a second priority to the message if the checking results in not finding the match, wherein the first priority is higher than the second priority.

38. The mobile station of claim 37, wherein the store further comprises an amount of available storage space and a previously stored message having a storage priority, and wherein the controller is further operable to store the message if the assigned priority is higher than the storage priority of the previously stored message.

39. The mobile station of claim 37, further comprising a survival parameter, wherein the receiver is further operable to receive the message further comprising a message survival condition, wherein the controller is further operable to store the message if the survival parameter meets the survival condition or delete the message if the survival parameter does not meet the survival condition.

40. The mobile station of claim 39, wherein the message survival condition further comprises a time-based survival condition or a position-based survival condition.

41. The mobile station of claim 37, wherein the receiver is further operable to receive the message further comprising display information, and wherein the controller is further operable to store the message if the display information defines the message as one to be stored for subsequent display or display the message if the display information defines the message as one for immediate display.

42. The mobile station of claim 41, further comprising a survival parameter wherein the receiver is further operable to receive the message further comprising a message survival condition, wherein the controller is further operable to store the message if the survival parameter meets the survival condition or delete the message if the survival parameter does not meet the survival condition.

43. The mobile station of claim 37, wherein the receiver is further operable to receive the message based on a delivery priority, and wherein the controller is further operable to determine a storage priority different from the delivery priority.

44. The mobile station of claim 43, wherein the receiver is further operable to receive the message from a message service centre in a predetermined order based on the delivery priority; and wherein the delivery priority further comprises delivery prioritization data including at least one of a validity period, a service centre time stamp, a protocol ID, an indication of more messages to send, a message originator-input priority, a messages waiting indicator, or an alert service centre indicator.

45. A method of handling messages at a mobile station in a cellular system, comprising:
receiving a message at the mobile station, the. message comprising at least one information element, wherein the at least one information element comprises display information;
determining a priority of the message according to a predetermined priority scheme executed by the mobile station and based on the display information;
determining whether to store the message depending on the determined priority; and
storing the message if the display information defines the message as one to be stored for subsequent display;
displaying and then deleting the message if the display information defines the message as one for immediate display.

46. The method of claim 45, further comprising dividing a data store into a display store portion and a holding store portion, wherein storing the message if the display information defines the message as one to be stored for subsequent display further comprises storing the message in the holding store portion, and wherein displaying and then deleting the message if the display information defines the message as one for immediate display further comprises storing the message in the display store portion.

47. The method of claim 45, wherein receiving the message comprising at least one information element further comprises receiving a message survival condition, further comprising:
checking a survival parameter on the mobile station, and
wherein the storing or the displaying further comprises storing or displaying if the survival parameter meets the survival condition, and automatically deleting the message when the survival parameter does not meet the survival condition.

48. The method of claim 47, wherein receiving the message survival condition further comprises receiving at least one of a time-based survival condition or a position-based survival condition.

49. A mobile station for receiving messages, comprising:
a receiver operable to receive a signal containing a message from a message source, the message comprising display information;

a store operable to store messages; and a controller operable to examine the display information of a received message, determine whether to store the message depending on the determined priority, store the message if the display information defines the message as one to be stored for subsequent display, and display and then delete the message if the display information defines the message as one for immediate display.

50. The mobile station of claim 49, wherein the data store further comprises a display store portion and a holding store portion, wherein the controller is further operable to store the message in the holding store portion if the display information defines the message as one to be stored for subsequent display, and wherein the controller is further operable to store the message in the display store portion and then display and delete the message if the display information defines the message as one for immediate display.

51. The mobile station of claim 49, further comprising a survival parameter, wherein the receiver is further operable to receive the message comprising a message survival condition, wherein the controller is further operable to store or display the received message if the survival parameter meets the survival condition, and wherein the controller is further operable to automatically delete the message when the survival parameter does not meet the survival condition.

52. The mobile station of claim 51, wherein the message survival condition further comprises at least one of a time-based survival condition or a position-based survival condition.

53. A method of handling messages at a mobile station in a cellular system, comprising:
receiving a message at the mobile station, the message comprising a message originator identifier, a message survival condition and display information, wherein the message survival condition defines a condition for storing or deleting the message, wherein the display information defines information foreither (i) displaying the message from a display store portion of a data store on the mobile station and then deleting the message or (ii) storing the message in a holding store portion;
determining a priority of the message according to a predetermined priority scheme executed by the mobile station and based, on the message originator identifier, the message survival condition and the display information;
determining whether to store or delete the message depending on the determined priority.

54. A mobile station for receiving messages, comprising:
a receiver operable to receive a signal containing a message from a message source, the message comprising a message originator identifier, a message survival condition and display information, wherein the message survival condition defines a condition for storing or deleting the message;
a store operable to store messages, wherein the store comprises a display store portion and a holding store portion; and
a controller operable to examine the message originator identifier, the message survival condition and the display information of a received message, determine a priority of the message according to a predetermined priority scheme and based on the message originator identifier, the message survival condition and the display information and determine whether to store or delete the message depending on the determined priority, wherein the display information defines information for either (i) displaying the message from the display store portion of the store and then deleting the message or (ii) storing the message in the holding store portion.

55. A mobile station for receiving messages in a cellular system, comprising:
means for receiving a message at the mobile station, the message comprising at least one information element, wherein the at least one information element comprises a message originator identifier;
means for checking a directory on the mobile station for a match to the message originator identifier, wherein the directory comprises at least one known message originator identifier;
means for determining a priority of the message according to a predetermined priority scheme executed by the mobile station and based on the message. originator identifier, wherein determining the priority of the message further comprises assigning a first priority if the checking results in finding the match, and assigning a second priority if the checking results in not finding the match, wherein the first. priority is higher than the second priority; and
means for determining whether to store the message depending on the determined priority.

56. A mobile station for receiving messages in a cellular system, comprising:
means for receiving a message at the mobile station, the message comprising at least one information element, wherein the at least one information element comprises display information;
means for determining a priority of the message according to a predetermined priority scheme executed by the mobile station and based on the display information;
means for determining whether to store the message depending on the determined priority;
means for storing the message if the display information defines the message as one to be stored for subsequent display; and
means for displaying and then deleting the message if the display information defines the message as one for immediate display.

57. A mobile station for receiving messages in a cellular system, comprising:
means for receiving a message at the mobile station, the message comprising a message originator identifier, a message survival condition and display information, wherein the message survival condition defines a condition for storing or deleting the message, wherein the display information defines information for either (i) displaying the message from a display store portion of a data store on the mobile station and then deleting the message or (ii) storing the message in a holding store portion;
means for determining, a priority of the message according to a predetermined priority scheme executed by the mobile station and based on the message originator identifier, the message survival condition and the display information; and
means for determining whether to store or delete the message depending on the determined priority.

* * * * *